United States Patent [19]
Sakai et al.

[11] Patent Number: 5,750,258
[45] Date of Patent: May 12, 1998

[54] CROSSLINKED RESIN-COATED SILICA FINE PARTICLES AND PROCESS FOR THE PRODUCTION THEREOF

[75] Inventors: Kazuhiko Sakai; Tatsuhiko Adachi; Norihiro Nakayama; Kenichi Fujino, all of Gifu, Japan

[73] Assignee: Ube Nitto Kasei Co., Ltd., Japan

[21] Appl. No.: 553,442

[22] PCT Filed: Apr. 7, 1995

[86] PCT No.: PCT/JP95/00685

§ 371 Date: Nov. 21, 1995

§ 102(e) Date: Nov. 21, 1995

[87] PCT Pub. No.: WO95/27680

PCT Pub. Date: Oct. 19, 1995

[30] Foreign Application Priority Data

Apr. 11, 1994 [JP] Japan ................... 6-071991

[51] Int. Cl.$^6$ ................... B32B 5/16; B05D 7/00
[52] U.S. Cl. ................... 428/405; 427/221; 427/301; 427/340; 428/407
[58] Field of Search ................... 428/405, 407; 427/212, 221, 301, 340

[56] References Cited

U.S. PATENT DOCUMENTS

| | | | |
|---|---|---|---|
| 4,137,367 | 1/1979 | Sample et al. | 428/443 |
| 4,225,650 | 9/1980 | Van Brederode et al. | 428/405 |
| 4,233,366 | 11/1980 | Sample et al. | 428/405 |
| 4,724,167 | 2/1988 | Evans et al. | 427/221 |
| 5,008,305 | 4/1991 | Kennan et al. | 523/212 |
| 5,013,585 | 5/1991 | Shimizu et al. | 427/220 |
| 5,035,803 | 7/1991 | Cohen | 210/656 |
| 5,153,068 | 10/1992 | Kohara et al. | 428/405 |
| 5,182,173 | 1/1993 | Swei | 428/391 |
| 5,194,333 | 3/1993 | Ohnaka et al. | 428/405 |

*Primary Examiner*—H. Thi Le
*Attorney, Agent, or Firm*—Nixon & Vanderhye

[57] ABSTRACT

The present invention relates to crosslinked resin-coated silica fine particles each of which has a crosslinked resin coating formed of a structure of a single layer or a plurality of layers formed on the surface of each calcined silica fine particle through a vinyl-containing silane coupling agent, and the crosslinked resin-coated silica fine particles of the present invention have characteristic features in that the peeling of the resin coatings substantially do not occur when they are dispersed in a dispersing medium with ultrasonic vibration, and that they substantially do not move after the formation of a liquid crystal cell and substantially do not affect a liquid crystal itself and its orientation when used as a spacer for a liquid crystal display device.

9 Claims, No Drawings

CROSSLINKED RESIN-COATED SILICA FINE PARTICLES AND PROCESS FOR THE PRODUCTION THEREOF

TECHNICAL FIELD

The present invention relates to crosslinked resin-coated silica fine particles suitable for controlling the thickness of a liquid crystal layer of a liquid crystal display device, and a process for the production thereof.

TECHNICAL BACKGROUND

A liquid crystal display device is typical of flat panel displays, and owing to its low dissipation power and low-voltage drive, it is widely used as a display device for various machines such as an electronic desk calculator, a television set, a computer and a word processor. The display panel of the liquid crystal display device is formed, for example, by attaching two transparent substrates provided with necessary elements such as transparent electrodes, oriented films, etc., with a sealing material while spacing them at a predetermined distance, to form a liquid crystal cell, and injecting a liquid crystal in the liquid crystal cell. A predetermined surface of one of the above two transparent substrates (surface to form an inner wall of the liquid crystal cell) is provided, in advance, with dispersed spacers, for example, by wet-spraying, for forming a liquid crystal layer having an intended thickness while spacing the two transparent substrates from each other at predetermined value of a distance (cell gap).

For obtaining a liquid crystal display device having excellent display characteristics, not only it is necessary to prevent an eluted component from the spacers from affecting the liquid crystal, but also it is required not to cause local variability on the distance between the two transparent substrates.

The spacer material that can satisfy the above requirements includes silica fine particles formed by hydrolyzing-polycondensing silicon alkoxide to form seed particles and growing these seed particles by a predetermined method (see JP-A-4-240112, JP-A-62-269933 and JP-A-63-73225). Since having a high purity, these silica fine particles are almost free from affecting a liquid crystal with its eluted component when brought into contact with the liquid crystal. Further, each silica fine particle has high particle diameter accuracy, and the CV value (coefficient of variability) of silica fine particles produced under the same conditions is low, so that the two transparent substrates can be spaced from each other substantially uniformly when the silica fine particles are used as a spacer. Since, however, all the spacers of silica fine particles disclosed in the above Japanese Laid-open Publications are not calcined, these spacers have a problem in that they undergo cracking under heat and pressure applied when a sealing material is cured.

Further, the above silica fine particles have suitable properties as a spacer for a liquid crystal display device. However, when these silica fine particles are used as a spacer for a liquid crystal display device, part of the silica fine particles move during the process of injecting a liquid crystal into liquid crystal cell, and in this movement, the oriented film is sometimes impaired thereby causing orientation nonuniformity. Further, a liquid crystal which adheres to a periphery of the liquid crystal cell at the time of injection of the liquid crystal is generally removed by ultrasonic cleaning. In this ultrasonic cleaning, however, part of the silica fine particles move, so that the oriented film is impaired to have orientation nonuniformity. For producing a liquid crystal display device having high display characteristics with high productivity, it is therefore necessary to prevent the substantial movement of the spacer when the injection of a liquid crystal and the ultrasonic cleaning are carried out after the formation of the liquid crystal cell.

As a spacer which does not cause the substantial movement after the formation of the liquid crystal cell, there is a spacer formed by surface-coating silica fine particles with a commercially available synthetic resin powder. Specifically, there is known a spacer formed by allowing silica fine particles to adsorb a commercially available synthetic resin powder on their surfaces with an electrostatic force, then exerting an impact thereon to melt part of the above synthetic resin with heat generated at this moment, and thereby mutually bonding the synthetic resin powder particles and fixing the synthetic resin powder to the silica fine particles (see JP-A-63-94224). In this spacer, the synthetic resin powder for coating the silica fine particles is melted under heat applied when the liquid crystal cell is formed by attaching two transparent substrates with a sealing material. The spacer therefore sticks to each transparent substrate, and as a result, the spacer substantially does not move after the formation of the liquid crystal cell.

JP-A-1-294702 discloses a method of producing polymer particles of which the particle size distribution is of monodisperse, in which a core material is dissolved or dispersed in a predetermined solution, then, a hydroxide and a strong acid are poured into the resultant dispersion to form oil drops consisting of the core material and oil-soluble materials formed therearound, such as a monomer, a polymerization initiator, etc., and the monomer in the oil drops is selectively polymerized. This publication discloses polymer fine particles obtained from silica fine particles as a core material. It is assumed that these polymer particles are almost free from movement after the formation of a liquid crystal cell when they are used as a spacer for a liquid crystal display device, although this effect is not disclosed in the above publication.

Further, JP-A-5-232480 discloses a liquid crystal spacer formed by introducing Si—H group onto a surface of crosslinked polymer particles having predetermined active hydrogen, further, converting the Si—H group into glycidyl group, then introducing vinyl group, and forming adhering layers of a thermoplastic resin on surfaces of the resultant crosslinked polymer particles by a graft-polymerization method. It also describes an example using, as crosslinked polymer particles, silica fine particles which are not calcined. In the liquid crystal spacer disclosed in this JP-A-5-232480, the adhering layer and the crosslinked polymer particle are bound by covalent bond, so that the peeling of the adhering layers from the crosslinked polymer particles hardly occur and that the adhering layers are softened to show excellent self-adhering properties to an oriented substrate. It is assumed that the above liquid crystal spacer hardly moves after the formation of a liquid crystal cell.

However, the spacer formed by coating the surfaces of silica fine particles with a commercially available synthetic resin particles, disclosed in JP-A-63-94224, has the following problems ① and ②. The ① The synthetic resin powder is required to have chemical resistance to a liquid crystal so that it may not be swollen or dissolved when brought into contact with the liquid crystal. It is therefore preferred to use a powder of a crosslinked resin as a synthetic resin powder. Since, however, a powder of a crosslinked resin is hard to melt, the bonding strength of the silica fine particles and the crosslinked resin powder is relatively low when the crosslinked resin powder is fixed to the silica fine particles by utilizing heat generated when an impact is exerted. And, as a method of preparing a spray solution to be used for spraying the spacer by a wet method, preferred is a method in which the spacer is dispersed in a predetermined dispersing medium with ultrasonic vibration, while the synthetic resin powder peels off due to the ultrasonic vibration when the bonding strength of the synthetic resin powder and the silica fine particle are low as above.

② Many synthetic resin powders generally contain a surfactant used as an emulsifier in the process of producing the resins. When the spacer is formed from a synthetic resin powder containing a surfactant, a very small amount of the surfactant is eluted from the spacer to a liquid crystal to decrease the specific resistivity value around it, so that an orientation-defective region such as a halo occurs around the spacer.

Further, in the method disclosed in JP-A-1-294702 in which polymer particles having a particle size distribution of monodisperse are produced by forming predetermined oil drops with a core material and a monomer and then selectively polymerizing the monomer in the oil drops, the particle size distribution of the so-formed fine particles has a considerable breadth, and there are obtained no fine particles which satisfy the monodisperse property (variability ratio 2% or less) which the spacer for a liquid crystal display device is required to have. It is required to classify the above particles for obtaining fine particles satisfying the above monodisperse property.

Further, when silica fine particles are used as a core material, the silica fine particles have an average particle diameter of 0.02 μm before coated, while the problem is that they finally grow to have an average particle diameter of 10.3 μm by coating them and that the coating thickness cannot be controlled. For decreasing the coating thickness to approximately 0.5 to 1 μm suitable for the spacer, it is required to decrease the monomer concentration. In this case, however, the amount of polymerizable functional group on the surfaces of the silica fine particles is small, so that it is no longer possible to form a uniform coating.

On the other hand, in the liquid crystal spacer disclosed in JP-A-5-232480 which is formed by coating an adhering layer of a thermoplastic resin on the surfaces of predetermined crosslinked polymer particles by the graft polymerization method, the adhering layer is formed of the thermoplastic resin, and when heated to a temperature (generally 120°~180° C.) for curing a sealing material used at a time of forming a liquid crystal cell, the thermoplastic resin therefore starts to melt, spreads itself over the orientation film surface wider than necessary and disorders the orientation of the liquid crystal in that portion. This disordered orientation of the liquid crystal causes defective display of a liquid crystal display device.

Further, JP-A-5-232480 discloses an example using non-calcined silica fine particles as particles on which the adhering layer is formed. In this case, however, the silica fine particles themselves have low strength, and it is therefore disadvantageous to use them as a spacer for a liquid crystal display device. In the method disclosed in this publication, further, no dispersion stabilizer is used, and it is therefore difficult to form monodisperse resin-coated particles having uniform resin coatings on their surfaces. There is another problem in that, since the step to be carried out until the introduction of vinyl group onto the surfaces of the crosslinked polymer particles is complicated, the production cost increases.

It is an object of the present invention to provide crosslinked rein-coated silica fine particles having advantages (i) that they have high hardness and strength as a whole and can perform the spacer function of maintaining a cell gap at a predetermined distance for a long period of time when used as a spacer for a liquid crystal display device, (ii) that they substantially do not cause the peeling of resin coatings when dispersed in a dispersing medium by ultrasonic vibration, and (iii) that they substantially show no movement after the formation of a liquid crystal cell, and substantially cause no adversary influence on a liquid crystal itself and its orientation, when used as a spacer for a liquid crystal display device, and a process for the production thereof.

DISCLOSURE OF THE INVENTION

The crosslinked resin-coated silica fine particles of the present invention which achieve the above object comprise calcined silica fine particles and crosslinked resin coatings each of which has a structure of a single layer or a plurality of layers formed on a surface of each calcined silica fine particle through a vinyl-containing silane coupling agent.

Further, the process for the production of crosslinked resin-coated silica fine particles, provided by the present invention, for achieving the above object comprises the steps of (A) surface-treating calcined silica fine particles with a vinyl-containing silane coupling agent to introduce vinyl group onto a surface of each silica fine particle; and (B) dispersing and polymerizing a mixture containing a monofunctional vinyl monomer (M) and a polyfunctional vinyl monomer (P) and having a charged P/M molar ratio of 0.5/99.5 to 70/30 mol % in a polar organic solvent in the presence of a dispersion stabilizer and a radical polymerization initiator, to form a crosslinked resin coating on a surface of each of the surface-treated silica fine particles.

The present invention will be explained in detail hereinafter.

The crosslinked resin-coated silica fine particles of the present invention are constituted of calcined silica fine particles, a vinyl-containing silane coupling agent and coatings of a crosslinked resin. Of these, the calcined silica fine particles are matrices forming core portions, and are obtained by calcining green silica fine particles (non-calcined silica fine particles) obtained by the hydrolysis and polycondensation of silicon alkoxide according to a so-called sol-gel method. The production process and properties of the calcined silica fine particles will be explained in detail concerning the process for the production of the crosslinked resin-coated silica fine particles of the present invention to be described later.

In the crosslinked resin-coated silica fine particles of the present invention, the vinyl-containing silane coupling agent is used for forming a crosslinked resin coating having an excellent adhesion property on the surface of each calcined silica fine particle by being present between each calcined silica fine particle and a crosslinked resin coating to be described later. This point will be described in detail below. The silane portion of the vinyl-containing silane coupling agent reacts with the silanol group on the calcined silica fine particle to form a chemical bond, and at the same time, the vinyl group of the vinyl-containing silane coupling agent reacts with the unsaturated double bond of monomer used for forming the crosslinked resin coating when the monomer is polymerized, to form a chemical bond, whereby a crosslinked resin coating excellent in adhesion is formed on the surface of each calcined silica fine particle through the vinyl-containing silane coupling agent as a coupling agent.

In the crosslinked resin-coated silica fine particles of the present invention, it is clear from the above explanation that the vinyl-containing silane coupling agent as a coupling agent is present in a state in which its vinyl group as a reactive group has reacted and its silane portion as another reactive group has reacted.

As the vinyl-containing silane coupling agent, there can be used any vinyl-containing silane coupling agent which has a silane portion (e.g., alkoxysilane, halogenosilane or acetoxysilane group) having reactivity with silanol group on each silica fine particle surface and which has a vinyl group having reactivity with the monomers used for forming the crosslinked resin coating. The term "vinyl group" is to be interpreted in the broadest sense, and is to include acryloyl group, methacryloyl group and allyl group in addition to the vinyl group itself. Specific examples of the above vinyl-containing silane coupling agent include vinyltrimethoxysilane, vinyltriethoxysilane, vinyltris(β-methoxyethoxy)silane, γ-methacryloxypropyltrimethoxysilane, vinyltrichlorosilane, vinyltris(β-methoxy)silane, N-β-(N-vinylbenzylaminoethyl)-γ-aminopropyltrimethoxysilane, vinyltriacetoxysilane and γ-methacryloxypropylmethyldimethoxysilane.

In the crosslinked resin-coated silica fine particles of the present invention, the crosslinked resin coating constitutes an outermost layer formed on each calcined silica fine particle through the vinyl-containing silane coupling agent. The crosslinked resin coating can be selected from various coatings depending upon the object of the crosslinked resin-coated silica fine particles and a field where they are used, while the crosslinked resin coating is required to be a product obtained by the polymerization of a monomer which satisfies the following conditions, (a) it has a polymerizable carbon-carbon double bond, and
(b) it has a functional group capable of reacting with the vinyl group of the vinyl-containing silane coupling agent.

When it is desired to use the crosslinked resin-coated silica fine particles as a spacer for a liquid crystal display device, it is preferred to constitute the above crosslinked resin coating by a crosslinked resin obtained by the polymerization of a mixture of a monofunctional vinyl monomer and a polyfunctional vinyl monomer. The formation of the crosslinked resin coating from this vinyl monomer mixture will be described in detail concerning the process for the production of the crosslinked resin-coated silica fine particles, provided by the present invention, to be described later.

When the crosslinked resin coating has a structure of a plurality of layers, a plurality of the layers may be formed of resins of the same kind or different kinds. Further, when the layers are formed of resins of the same kind, the monomer composition as a raw material may be different among a plurality of the resins.

The crosslinked resin-coated silica fine particles of the present invention have the following advantages.

(i) Each core portion (matrix) is formed of a calcined silica fine particle, so that the crosslinked resin-coated silica fine particles have high strength and hardness, and can perform, for a long period of time, the function of maintaining the cell gap at a predetermined distance.

(ii) The crosslinked coating is formed on the surface of each calcined silica fine particle through the vinyl-containing silane coupling agent, so that the crosslinked resin-coated silica fine particles are excellent in adhesion between the surface of each calcined silica fine particle and the crosslinked coating. Therefore, the crosslinked resin coatings are substantially not peeled off from the silica fine particles when the crosslinked resin-coated silica fine particles are dispersed in a dispersing medium by ultrasonic vibration. That is, the above crosslinked resin coating has durability against ultrasonic treatment.

(iii) The crosslinked resin coating formed on the surface of each silica fine particle has lower hardness than the silica fine particles as matrices and has proper elasticity, flexibility and cushion property. When the crosslinked resin-coated silica fine particles of the present invention are used as a spacer for a liquid crystal display device, therefore, the crosslinked resin coatings properly spread in a lateral direction under a load and heat at a time of producing a liquid crystal cell to stick to the substrate surface (oriented film surface), and as a result, the crosslinked resin-coated silica fine particles substantially do not move after the formation of a liquid crystal cell. The crosslinked resin coatings in the crosslinked resin-coated silica fine particles of the present invention substantially do not spread more than necessary. Further, since substantially no component that affects a liquid crystal is eluted from the crosslinked resin coatings, substantially, no disorder takes place in the orientation of a liquid crystal.

The preferred numeral conditions of the crosslinked resin-coated silica fine particles of the present invention will be described below.

The crosslinked resin-coated silica fine particles of the present invention preferably have an average particle diameter of 0.6 to 17 μm and a variability coefficient of 2% or less in their particle size distribution.

When the crosslinked resin-coated silica fine particles have an average particle diameter in the above range, they are suitable for use as a spacer for a liquid crystal display device. The reason why 0.6 μm is preferred as the lower limit of the average particle diameter is that the lower limit of the cell gap of a liquid crystal display device is generally 0.6 μm. On the other hand, the reason why 17 μm or less is preferred as an average particle diameter is as follows. For obtaining crosslinked resin-coated silica fine particles having a large average particle diameter, it is required to use, as a matrix, calcined silica fine particles having a large average particle diameter. However, silica fine particles having large particle diameters are liable to precipitate to mutually bond to each other in a solution when the crosslinked resin-coated silica fine particles are produced according to the process of the present invention to be described later. When the bonding takes place, it is difficult to obtain intended crosslinked resin-coated silica fine particles. For this reason, the upper limit of the average particle diameter of the crosslinked resin-coated silica fine particles is defined depending upon the upper limit of the average particle diameter of the silica fine particles used as a matrix, and the value thereof is preferably 17 μm.

When the crosslinked resin-coated silica fine particles of the present invention are used as a spacer for a liquid crystal display device, the average particle diameter thereof is preferably 1.0 to 12 μm, particularly preferably 1.4 to 10 μm.

The variability coefficient (to be referred to as "CV value" hereinafter) of 2% or less in particle size distribution means that a monodisperse property is satisfied. The reason why the CV value of 2% or less is preferred is as follows. When the CV value exceeds 2%, there is caused a change on the drive voltage of a liquid crystal, which consequently causes a decrease in contrast and nonuniformity of displayed colors.

so that such crosslinked resin-coated silica fine particles are not suitable for use as a spacer for a liquid crystal display device.

The CV value is calculated on the basis of the following equation.

CV value (%)=(standard deviation of particle diameter)÷(average particle diameter)×100

In the crosslinked resin-coated silica fine particles of the present invention, the thickness of the crosslinked resin coating is generally preferably in the range of from 0.05 to 1 μm although depending upon the particle diameter of the crosslinked resin-coated silica fine particles. When the thickness of the crosslinked resin coating is less than 0.05 μm, it is difficult to obtain crosslinked resin-coated silica fine particles which substantially do not move after the formation of a liquid crystal cell when used as a spacer for a liquid crystal display device. On the other hand, when the thickness of the crosslinked resin coating exceeds 1 μm, it is difficult to obtain crosslinked resin-coated silica fine particles having a CV value of 2% or less without classifying them. Further, in crosslinked resin-coated silica fine particles of which the crosslinked resin coating thickness exceeds 1 μm, the proportion of the thickness of the crosslinked resin coating which is to undergo compressive deformation, based its outer diameter, is greater, and as a result, the amount of the compressive deformation under a load increases. When such crosslinked resin-coated silica fine particles are used as a spacer for a liquid crystal display device, therefore, the spacer undergoes large compressive deformation under a load exerted at the time of assembling a liquid crystal cell, which makes it difficult to obtain a desired cell gap. The thickness of the crosslinked resin coating is preferably approximately 0.05 to 0.3 μm when the silica fine particles have a particle diameter of about 4 μm or less, and it is preferably approximately 0.05 to 0.5 μm when the silica fine particles have a particle diameter of 4 μm or more.

The process for the production of crosslinked resin-coated silica fine particles, provided by the present invention, will be explained hereinafter.

The process for the production of crosslinked resin-coated silica fine particles, provided by the present invention comprises the steps of (A) surface-treating calcined silica fine particles with a vinyl-containing silane coupling agent to introduce vinyl group onto a surface of each silica fine particle; and (B) dispersing and polymerizing a mixture containing a monofunctional vinyl monomer (M) and a polyfunctional vinyl monomer (P) and having a charged P/M molar ratio of 0.5/99.5 to 70/30 mol % in a polar organic solvent in the presence of a dispersion stabilizer and a radical polymerization initiator, to form a crosslinked resin coating on a surface of each of the surface-treated silica fine particles.

Each step will be explained in detail hereinafter.

Step (A)

The step (A) is a step in which molecules (vinyl-containing silane coupling agent) for binding calcined silica fine particles and crosslinked resin coatings to be formed on surfaces thereof are introduced onto the surfaces of the calcined silica fine particles.

The calcined silica fine particles which are matrices for the crosslinked resin-coated silica fine particles are those which are substantially spherical fine particles and are substantially not mutually combined together. These calcined silica fine particles may be porous. In the present invention, calcined silica fine particles refer to silica fine particles which are calcined to have a particle strength of at least 70 kgf/mm². The particle strength refers to a value obtained by determining a compression breaking load with a microcompression tester (MCTE-200) supplied by Shimadzu Corporation and converting it into a particle strength (St) according to the following equation described in Journal of Japan Mining Society, Vol. 81, No. 10, page 1,024 (1965).

Particle strength $St$ (kgf/mm²) = $2.8P/\pi d^2$ $$\left[\begin{array}{l} P: \text{Compression breaking load (kgf)} \\ d: \text{Particle diameter (mm)} \end{array}\right]$$

Crosslinked resin-coated silica fine particles obtained from non-calcined silica fine particles (green silica fine particles produced by a sol-gel method) as a matrix have a particle strength of about 50 kgf/mm², and their particle strength is insufficient for use thereof as a spacer for a liquid crystal display device. That is, when crosslinked resin-coated silica fine particles from non-calcined silica fine particles are used as a spacer for a liquid crystal display device, improperly, they are sometimes deformed due to a pressure exerted at the time of forming a liquid crystal cell, and no uniform cell gap is obtained.

It is sufficient that the average particle diameter of the calcined silica fine particles which are to form matrices should be such a size that intended crosslinked resin-coated silica fine particles can be obtained, and the above average particle diameter differs depending upon the average particle diameter of the crosslinked resin-coated silica fine particles and the thickness of the crosslinked resin coating. Specifically, the above average particle diameter is in the range of from 0.5 to 15 μm, preferably 0.8 to 12 μm, particularly preferably 1.0 to 10 μm. The CV value is preferably 2% or less, particularly preferably 1.5% or less. The reason why the range of 0.5 to 15 μm is preferred as the average particle diameter of the silica fine particles is that when the average particle diameter is out of the above range, it is difficult to obtain the intended crosslinked resin-coated silica fine particles. The reason why the CV value of the silica fine particles is preferably 2% or less is that when silica fine particles having a CV value of over 2% are used, there are substantially obtained no crosslinked resin-coated silica fine particles which satisfy the monodisperse property (variability ratio 2% or less) of a particle size distribution which is required of a spacer for a liquid crystal display device.

The calcined silica fine particles as matrices of the crosslinked resin-coated silica fine particles of the present invention can be those obtained by any method so long as they satisfy the above requirements. The silica fine particles which have not yet been calcined are obtained by a so-called sol-gel method, and specific examples thereof include the following (a) and (b).

(a) Seed particles whose particle size distribution is of monodisperse are formed by the hydrolysis and polycondensation of silicon alkoxide. Then, there is carried out a growth process in which silicon alkoxide is added to a dispersion of the seed particles in the presence of a catalyst to grow the above seed particles and to increase their particle diameters. This growth process is repeated a plurality of times while maintaining the monodisperse of the particle size distribution by classifying the particles after each grow process is completed, whereby silica fine particles are obtained (see JP-A-4-240112).

(b) Silicon alkoxide is added to a dispersion of silica seed particles in a mixed solvent of an alcohol and aqueous ammonia, to hydrolyze it, whereby the silica seed particles are grown to obtain silica particles. In this case, the ratio So/Vo (the ratio of the total surface area S of all the silica seed particles in the dispersion to which the silicon alkoxide has not been added, to the total volume Vo of solution components of the dispersion) is adjusted to at least 300 cm²/cm³, and further, the ratio S/V (the ratio of the total surface area S of all the silica particles which has grown in the dispersion after the addition of the silicon alkoxide, to the total volume V of solution components of the dispersion) is adjusted to 300–1,200 cm²/cm³. In this manner, silica fine particles having two kinds of particle diameter distributions which do not overlap each other are obtained, and then, silica fine particles of one kind are obtained by classifying them (see Japanese Patent Application No. 4-204059).

As described above, the silica fine particles are obtained by carrying out the dehydration and polycondensation of silicon alkoxide in a mixed solution containing water, ammonia and an alcohol. Since the so-obtained non-calcined silica fine particles have many silanol groups (Si—OH), it is relatively easy to introduce polymerizable functional group onto the surfaces of the silica fine particles by means of a silane coupling agent. However, the non-calcined silica fine particles contain a considerable amount of remaining organic material, water and ammonia, and their strength and hardness are low as described above. When the non-calcined are calcined at 500° to 1,200° C., the organic substance and water volatilize, and the silanol groups undergo mutual condensation to increase siloxane bonds (Si—O—Si), whereby the strength and hardness increase. Therefore, the strength and hardness are improved by the calcining, while the number of the silanol groups which are present on the surfaces of the silica fine particles and work as reactive cites for a vinyl-containing silane coupling agent decrease since they are consumed for the condensation, and the reaction with the vinyl-containing silane coupling agent does not proceed easily, or does not proceed at all.

The amount of the silanol groups which are removed differs greatly depending upon conditions such as a temperature at which and a time for which the silica fine particles are calcined and the surface areas of the particles. For example, when the calcined silica fine particles have a low calcining degree and a relatively large amount of the silanol groups on their surfaces, the introduction of vinyl groups by the reaction with the vinyl-containing silane coupling agent relatively easily proceeds, so that the calcined silica fine particles can be directly surface-treated with the vinyl-containing silane coupling agent.

However, when calcined silica fine particles which have a high calcining degree and contain a decreased amount of the silanol groups as reactive cites, are directly treated with the vinyl-containing silane coupling agent, a sufficient amount of vinyl groups cannot be introduced onto the surfaces of the silica fine particles, and therefore, no silica fine particles having uniformly crosslinked resin coatings can be obtained.

Therefore, when the amount of the silanol groups on the surfaces of the calcined silica fine particles is insufficient (i.e., when the amount of the vinyl groups to be introduced onto the surfaces of the silica fine particles by reacting with the vinyl-containing silane coupling agent becomes insufficient), preferably, silicon alkoxide or its partial hydrolysis product is allowed to react with the calcined silica fine particles to introduce silanol groups onto the surfaces of the calcined silica fine particles, whereby the amount of reactive cites for the vinyl-containing silane coupling agent is increased to introduce a necessary amount of vinyl groups. That is, calcined silica fine particles having a high calcining degree are treated with silicon alkoxide or its partial hydrolysis product, whereby calcined silica fine particles having high strength and high hardness, which conventionally cannot be used as matrices for a spacer for a liquid crystal display device, can be advantageously used as the matrices.

Under alkaline conditions, silicon alkoxide is hydrolyzed and gradually dehydrated-condensed as shown by the following reaction schemes.

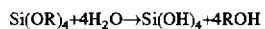

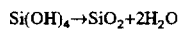

Siloxane bond-rich surfaces of calcined silica fine particles and the tetrahydroxysilane formed by the above hydrolysis are essentially homogeneous components and not distinguishable. Therefore, the above-formed tetrahydroxysilane is integrated with the surfaces of the calcined silica fine particles to form a state in which a thin film of tetrahydroxysilane is formed on the surface of each silica fine particle. The vinyl-containing silane coupling agent reacts with the silanol group of the thin tetrahydroxysilane film formed on each calcined silica fine particle, and vinyl group is introduced onto the surface of each silica fine particle.

The silicon alkoxide or its partial hydrolysis product, used in the present invention, is not specially limited so long as the silanol groups can be introduced onto the surfaces of the calcined silica fine particles. The silicon alkoxide used in this case has the following formula,

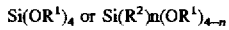

(wherein each of $R^1$ and $R^2$ is an alkyl or acyl group, particularly an alkyl group having 1 to 5 carbon atoms or an acyl group having 2 to 6 carbon atoms, and n is an integer of 1 to 3). Specific examples thereof include tetramethoxysilane, tetraethoxysilane, tetrapropoxysilane and tetrabutoxysilane.

The partial hydrolysis product of silicon alkoxide includes those obtained by hydrolyzing part of a plurality of alkoxy groups ($OR^1$) or ($OR^2$) of the silicon alkoxide of the above general formula.

The reaction with the silicon alkoxide or its partial hydrolysis product (to be referred to as "silicon alkoxide treatment" hereinafter) can be carried out concurrently with, and/or after, the surface treatment of the calcined silica fine particles with the vinyl-containing silane coupling agent (to be referred to as "coupling agent treatment" hereinafter) (i.e., step (A)). That is, the silicon alkoxide treatment may be carried out before the coupling agent treatment, concurrently with the coupling agent treatment, or both before and concurrently with the coupling agent treatment.

The amount of the silicon alkoxide or its partial hydrolysis product for the silicon alkoxide treatment per mole of the vinyl-containing silane coupling agent is preferably 0.5 mol or less, particularly 0.25 mol or less.

In the present invention, the vinyl-containing silane coupling agent used in the coupling agent treatment of the step (A) of the process for the production of crosslinked resin-coated silica fine particles, provided by the present invention, can be any one selected from those which have a silane portion (e.g., alkoxysilane, halogenosilane and acetoxysilane groups) having reactivity with the silanol groups on the surfaces of the silica fine particles and which have a vinyl group having reactivity with the monomer(s)

for forming the crosslinked resin coating, as already explained. The term "vinyl group" is to be interpreted in a broadest sense, and shall include acryloyl, methacryloyl and allyl groups in addition to a vinyl group itself.

Specific examples of the above vinyl-containing silane coupling agent include vinyltrimethoxysilane, vinyltriethoxysilane, vinyltris($\beta$-methoxyethoxy)silane, $\gamma$-methacryloxypropyltrimethoxysilane, vinyltrichlorosilane, vinyltris($\beta$-methoxy)silane, N-$\beta$-(N-vinylbenzylaminoethyl)-$\gamma$-aminopropyltrimethoxysilane, vinytriacetoxysilane and $\gamma$-methacryloxypropylmethyldimethoxysilane.

The above vinyl-containing silane coupling agents may be used alone or in combination of a plurality of the agents.

The vinyl-containing silane coupling agent is used preferably in an amount equivalent to 0.5 to 5 mmol/m$^2$ per unit surface area of the calcined silica fine particles, particularly preferably in an amount equivalent to 1 to 3 mmol/m$^2$.

In the process for the production of crosslinked resin-coated silica fine particles, provided by the present invention, the above step (A) of surface-treating the silica fine particles with the vinyl-containing silane coupling agent is carried out first. This step (A) can be carried out, for example, as follows. First, the calcined silica fine particles are dispersed in an alcohol solvent such as methanol, ethanol or 2-propanol by means of ultrasonic vibration, to obtain a desired dispersion. The solvent in this case may be one alcohol, or may be a mixture of a plurality of alcohols. The weight of the alcohol solvent is preferably 5 to 30 times as large as the weight of the calcined silica fine particles. To the so-obtained dispersion is added 25 to 30% aqueous ammonia in an amount which is 2 to 30 times as large as the weight of the calcined silica fine particles. Further, the vinyl-containing silane coupling agent is added. The dispersion is stirred for 1 to 24 hours while maintaining the liquid temperature of the dispersion at 20° to 80° C., whereby the calcined silica fine particles are surface-treated with the vinyl-containing silane coupling agent, and the vinyl groups are introduced onto the surfaces of the calcined silica fine particles.

As described above, during the surface treatment with the vinyl-containing silane coupling agent, silicon alkoxide in a small amount (0.5 or less as a molar ratio of silicon alkoxide to vinyl-containing silane coupling agent) may be added as required. In the co-presence of the vinyl-containing silane coupling agent and the silicon alkoxide having a high hydrolysis rate, vinyl groups in an amount sufficient for forming uniform crosslinked resin coatings are introduced onto the surfaces of the calcined silica fine particles.

Step (B)

The step (B) of forming crosslinked resin coatings on the surfaces of the calcined silica fine particles will be explained hereinafter.

In the step (B), while the silica fine particles having vinyl groups which are introduced onto their surfaces by carrying out the step (A) are dispersed in a polar organic solvent in the presence of a dispersion stabilizer, a mixture containing a monofunctional vinyl monomer (M) and a polyfunctional monomer (P) and having a charged P/M molar ratio of 0.5/99.5~70/30 mol % is added to, and dissolved in, the dispersion, and the above mixture containing the monofunctional vinyl monomer and the polyfunctional vinyl monomer is polymerized in the presence of a radical polymerization initiator, to form crosslinked resin coatings on the surfaces of the silica fine particles which have the vinyl groups introduced onto their surfaces, whereby crosslinked resin-coated silica fine particles are formed in the reaction solution.

The crosslinked resin coatings formed on the calcined fine particles in the step (B) are formed of a crosslinked resin which does not cause the elution of components when brought into contact with any one of nematic, supertwisted nematic (STN) and ferroelectric liquid crystals, and have a substantially uniform thickness. The crosslinked resin-coated silica fine particles of the present invention are therefore substantially free from affecting a liquid crystal itself and its orientation when used as a spacer for a liquid crystal display device. Specific examples of the above crosslinked resin coating include coatings formed of at least one of styrene-containing resins, acrylic resins and methacrylic resins.

Further, when the above crosslinked resin-coated silica fine particles are used as a spacer for a liquid crystal display device, the above crosslinked resin coatings are laterally properly flattened and stick to the substrate surface (oriented film surface) under a load and heat at a time of producing the liquid crystal cell, and as a result, the crosslinked resin-coated silica fine particles substantially do not move after the formation of the liquid crystal cell. In this case, when heated up to a curing temperature (approximately 120° to 180° C.) for a sealing material used for forming the liquid crystal cell, the crosslinked resin coatings are softened to some extent, while the crosslinked resin coatings substantially do not spread more than necessary at the time of producing a liquid crystal cell, since the flowability thereof is not so high as that of a thermoplastic resin. That is, the crosslinked resin coatings in the crosslinked resin-coated silica fine particles of the present invention have a crosslinked structure, and are not of a so-called thermoplastic resin.

The polyfunctional monomer that can be used for forming the above crosslinked resin coating in the step (B) refers to a monomer having at least two carbon-carbon double bonds. Specific examples thereof include divinylbenzene, acrylates of polyhydric alcohols (ethylene glycol diacrylate, glycerin diacrylate and glycerin triacrylate), and methacrylates of polyhydric alcohols (ethylene glycol dimethacrylate, glycerin dimethacrylate, glycerin trimethacrylate, trimethylolpropane trimethacrylate and polyethylene glycol dimethacrylate). The monofunctional vinyl monomer that can be similarly used in the step (B) refers to a monomer having one carbon-carbon double bond. Specific examples thereof include vinyl aromatic hydrocarbons (styrene, $\alpha$-methylstyrene, vinyltoluene, $\alpha$-chlorostyrene, o-chlorostyrene, m-chlorostyrene, p-chlorostyrene and p-ethylstyrene), acrylic acid, acrylic acid esters (methyl acrylate, ethyl acrylate, propyl acrylate, butyl acrylate, hexyl acrylate, 2-ethylhexyl acrylate, cyclohexyl acrylate, $\beta$-hydroxyethyl acrylate, $\beta$-aminoethyl acrylate, N,N-dimethylaminoethyl acrylate and $\gamma$-hydroxypropyl acrylate), methacrylic acid, methacrylic acid esters (methyl methacrylate, ethyl methacrylate, propyl methacrylate, butyl methacrylate, hexyl methacrylate, 2-ethylhexyl methacrylate, cyclohexyl methacrylate, $\beta$-hydroxyethyl methacrylate, $\beta$-aminoethyl methacrylate, N,N-dimethylaminoethyl methacrylate, $\gamma$-hydroxypropyl methacrylate and glycidyl methacrylate), and vinylsilanes (vinyltrimethoxysilane, vinyltriethoxysilane, vinyltrimethylsilane and $\gamma$-methacryloxypropyltrimethoxysilane).

The above polyfunctional vinyl monomers or the above monofunctional vinyl monomers may be used alone or in combination of at least two monomers.

In the mixture of the above monofunctional vinyl monomer (M) and the polyfunctional vinyl monomer (P), the charged P/M molar ratio is limited to 0.5/99.5~70/30 mol %.

The charged P/M molar ratio is preferably 1/99–70/30 mol %, particularly preferably 5/95–60/40 mol %.

A crosslinked resin coating obtained from a mixture containing the above monofunctional vinyl monomer and the above polyfunctional vinyl monomer but having a charged P/M molar ratio of less than 0.5/99.5 mol % is not suitable for obtaining crosslinked resin-coated silica fine particles which can be suitably used as a spacer for a liquid crystal display device for the following reasons (1) and (2).

(1) When brought into contact with a liquid crystal, all of the crosslinked resin coating is eluted so that a disorder of orientation is caused on a liquid crystal when the crosslinked resin-coated silica fine particles are used as a material for a spacer for a liquid crystal display device.

(2) The cross-linked resin has a low softening point. Therefore, when the crosslinked resin-coated silica fine particles are used as a material for a spacer for a liquid crystal display device, the coating is softened under heat which is applied for forming a liquid crystal cell by attaching two transparent substrates with a sealing material, so that the coating spreads over the transparent substrate and occupies an area several times larger than a projected area of the spacer, and that a disorder of orientation is caused on the liquid crystal display device.

As the charged P/M molar ratio comes close to 70/30 mol %, a precipitated polymer becomes finer, and the polymer is not so easily deposited onto a matrix surface and a thin and uniform crosslinked resin coating can not be formed.

In the step (B), it is essential to carry out dispersion polymerization in the presence of a dispersion stabilizer. By adding the dispersion stabilizer, the mutual binding of silica fine particles on which surfaces the crosslinked resin coatings are formed, i.e., crosslinked resin-coated silica fine particles, is substantially prevented, and the polymerization of the crosslinked resin coatings on the surfaces of the silica fine particles properly proceed.

Specific examples of the dispersion stabilizer used in the step (B) include polyvinylpyrrolidone, polyvinyl methyl ether, polyethyleneimine, polyacrylic acid, polyvinyl alcohol, ethyl cellulose and hydroxypropyl cellulose.

Specific examples of the polar organic solvent includes alcohols such as 2-propanol, butanol, amyl alcohol and benzyl alcohol, esters such as ethyl acetate, ketones such as acetone and methyl ethyl ketone, nitriles such as acetonitrile, and amides such as formamide and dimethylamide.

The method of dispersing the surface-treated silica fine particles in the polar organic solvent in the presence of the dispersion stabilizer is not specially limited, while a desired dispersion can be obtained by the following method (a) or (b).

(a) First, the dispersion stabilizer is dissolved in the polar organic solvent, to prepare a solution of which the dispersion stabilizer concentration is several % by weight. Then, the surface-treated silica fine particles are added to the solution, and the silica fine particles are dispersed with ultrasonic vibration, or the like, to obtain an intended dispersion. In this case, the amount of the silica fine particles is arranged to be several % by weight based on the polar organic solvent.

(b) First, the surface-treated silica fine particles are added to a polar organic solvent and dispersed therein with ultrasonic vibration, or the like. In this case, the amount of the silica fine particles is arranged such that the amount of the silica fine particles is several % by weight on the basis of organic solvent in the dispersion to be finally obtained. Separately, a solution of the dispersion stabilizer in an organic solvent is prepared. The concentration of the dispersion stabilizer in this solution is arranged such that the ratio of the dispersion stabilizer is several % by weight on the basis of the polar organic solvent in the dispersion to be finally obtained. Then, the above dispersion of the silica fine particles in the organic solvent and the above solution of the dispersion stabilizer in the organic solvent are mixed, to obtain an intended dispersion.

In the step (B), the surface-treated silica fine particles from the step (A) are dispersed in the polar organic solvent in the presence of the dispersion stabilizer as described above, and then, the mixture containing the monofunctional vinyl monomer and the polyfunctional vinyl monomer (to be referred to as "monomer mixture" hereinafter) is added to, and dissolved in, the dispersion. And, the above monomer mixture is polymerized in the presence of a radical polymerization initiator. This radical polymerization initiator is selected from azo polymerization initiators such s 1,1'-azobisisobutyronitrile and peroxides such as benzoyl peroxide.

The amount of the radical polymerization initiator based on the monomer mixture is preferably 1 to 50 mol %, particularly preferably 10 to 30 mol %.

In the step (B), the monomer mixture may be added after the radical polymerization initiator is added to the dispersion of the silica fine particles treated with the coupling agent in the polar organic solvent or concurrently with the addition of the radical polymerization initiator. When the radical polymerization initiator is added to the above dispersion prior to the addition of the monomer mixture, this addition may be carried out, for example, by directly adding the radical polymerization initiator to the above dispersion. When the monomer mixture is added to the above dispersion concurrently with the addition of the radical polymerization initiator, this addition may be carried out, for example, by adding a mixture of the monomer mixture and the radical polymerization initiator to the above dispersion. In each case, the monomer mixture is added in such an amount that the concentration of the monomer mixture in a dispersion after it is added is preferably at least 0.5% by weight, particularly preferably 1.0 to 10% by weight.

In the step (B), the polymerization of the monomer mixture can be carried out by stirring the dispersion containing the monomer mixture and the radical polymerization initiator for 1 to 24 hours while maintaining the dispersion temperature at 20° to 80° C. By this polymerization, a desired crosslinked resin coating is formed on each surface of the silica fine particles which have been surface-treated with the vinyl-containing silane coupling agent.

The thickness of the crosslinked resin coating formed by the polymerization in the step (B) is preferably 0.05 to 1 μm, particularly preferably 0.1 to 0.5 μm. The thickness of the crosslinked resin coating can be controlled by properly adjusting the concentration of the monomer mixture in the dispersion, the concentration of the radical polymerization initiator and the polymerization time.

After the step (B), the polymerization can be terminated by a conventional method in which the reaction mixture is poured into a predetermined amount of an organic solvent (alcohols such as methanol and 2-propanol, acetone, N-methylpyrrolidone, dimethylformamide or the like) or a mixed solvent of organic solvent/water=1:1 (volume ratio) after or without allowing the reaction mixture to cool.

Concurrently with the polymerization of the monomer mixture in the step (B), a number of fine particles of a crosslinked resin are formed in the reaction mixture as a byproduct. The size of these fine particles of a crosslinked resin are significantly small as compared with that of the crosslinked resin-coated silica fine particles, and are present in a suspended state in the reaction mixture together with the crosslinked resin-coated silica fine particles. After the termination of the polymerization in the step (B), therefore, the crosslinked resin particles formed in the reaction mixture as a byproduct are removed by washing and the crosslinked resin-coated silica fine particles of the present invention are collected.

The above washing can be carried out, for example, by allowing the reaction mixture just after the termination of the polymerization to stand to precipitate the crosslinked resin-coated silica fine particles of the reaction mixture, removing the supernatant, adding a mixed solvent of organic solvent (alcohols such as methanol and 2-propanol, acetone, N-methylpyrrolidone, dimethylformamide or the like)/water=1:1 (volume ratio) to re-disperse the crosslinked resin-coated silica fine particles in the wash liquid, and then consecutively repeating the precipitation of the crosslinked resin-coated silica fine particles and the removal of supernatant. The washing is carried out repeatedly as required until a clear supernant is obtained. Further, a centrifugal separator may be used to decrease the time required for the precipitation.

After the fine particles of a crosslinked resin are removed as described above, the intended crosslinked resin-coated silica fine particles can be isolated, for example, by replacing the wash liquid with water and freeze-drying the resultant product.

In the crosslinked resin-coated silica fine particles obtained by carrying out the above steps (A) and (B), the crosslinked resin coatings have the structure of a single layer (to be referred to as "single-layered crosslinked resin-coated silica fine particles" hereinafter). The crosslinked resin coating may have the structure of a single layer or a plurality of layers as already described, and the crosslinked resin-coated silica fine particles whose crosslinked resin coatings have the structure of at least two layers can be obtained, for example, by carrying out the following step (C).

Step (C)

First, the single-layered crosslinked resin-coated silica fine particles are separated and recovered as described above, and then, while the single-layered crosslinked resin-coated silica fine particles are dispersed in a polar organic solvent in the presence of a dispersion stabilizer. A mixture containing a monofunctional vinyl monomer (M) and a polyfunctional vinyl monomer (P) and having a charged P/M molar ratio of 0.5/99.5 to 70/30 mol % is added to, and dissolved in, the dispersion. Then, the above mixture of a monofunctional vinyl monomer and a polyfunctional vinyl monomer is polymerized in the presence of a radical polymerization initiator, to further form a crosslinked resin coating on each of the above single-layered crosslinked resin-coated silica fine particles, whereby crosslinked resin-coated silica fine particles each of which has a fresh second resin coating are formed in the reaction mixture.

Then, fine particles of a crosslinked resin produced as a byproduct are removed by washing, and then fresh two-layered crosslinked resin-coated silica fine particles are separated and recovered, in the same manner as described above, whereby the intended crosslinked resin-coated silica fine particles having a crosslinked resin coating having the structure of a plurality of layers can be obtained.

The dispersion stabilizer, the polar organic solvent, the monofunctional vinyl monomer, the polyfunctional vinyl monomer and the radical polymerization initiator may be same as, or different from, those used for forming the first crosslinked resin coating. Specific examples of these are as described already. Further, the method of dispersing the single-layered crosslinked resin-coated silica fine particles in the presence of the dispersion stabilizer is carried out according to the method described in the step (B). The procedures taken thereafter are also according to those taken for obtaining the single-layered crosslinked resin-coated silica fine particles.

Crosslinked resin-coated silica fine particles whose crosslinked resin coating has the structure of three layers or more can be also obtained by forming fresh crosslinked resin coating(s) on an outermost crosslinked resin coating in the same manner.

Not only the crosslinked resin-coated silica fine particles of the present invention can be directly used as a spacer for a liquid crystal display device without classifying them, but also they can be suitably used as a filler for a semiconductor-sealing resin and a filler for a dental material resin.

EXAMPLES

The present invention will be explained specifically with reference to Examples hereinafter.

Example 1

Step (A)—Surface Treatment of Calcined Silica Fine Particles

50 Grams of calcined silica fine particles (total surface area 30.4m$^2$) having a particle size distribution of monodisperse (average particle diameter 5.34 μm, CV value 0.8%, each particle being substantially spherical, calcining temperature 500° C., particle strength 80 kgf/mm$^2$) were placed in a flask having an internal volume of 1 liter, and 315 g of 2-propanol was added. Then, the above silica fine particles were fully dispersed with ultrasonic vibration. Methanol in a amount of 315 g was added to the dispersion, and then, while the mixture temperature was maintained at 40° C., it was stirred for 15 minutes. Thereafter, 125 g of 25% aqueous ammonia was added, and the mixture was stirred at 40° C. for 15 minutes to give a mixture solution. A mixture containing 21.5 g (0.0867 mol) of γ-methacryloxypropyltrimethoxysilane, one of vinyl-containing silane coupling agents, and 2.8 g (0.013 mol) of tetraethoxysilane, one of silicon alkoxides, was added to the above mixture solution over 10 minutes. After the addition, the resultant solution was temperature-increased up to 60° C. and the solution was stirred for 10 hours to surface-treat the silica fine particles.

After the surface treatment, the solution was allowed to stand to precipitate the silica fine particles, and the supernatant was removed to give surface-treated silica fine particles (to be referred to as "surface-treated silica fine particles" hereinafter). The so-obtained surface-treated silica fine particles were washed by repeating the precipitation of the surface-treated silica fine particles in methanol and decantation thereof, and the methanol was removed. Then, the surface-treated silica fine particles were dried in an oven at 150° C. for 1 hour.

The so-obtained surface-treated silica fine particles had γ-methacryloxypropyl group introduced onto the surface of each of them, and showed water-repellency. It was endorsed by the observation of absorption of vinyl group and ester group in the measurement of infrared absorption spectrum that the γ-methacryloxypropyl group was introduced onto the surfaces of the silica fine particles.

Step (B)—Formation of Crosslinked Resin Coating

5 Grams of the surface-treated silica fine particles obtained in the step (A) were added to a solution of 7.5 g of polyvinylpyrrolidone K-90 (supplied by Wako Purechemical Industries, Ltd.: molecular weight 400,000) as a dispersion stabilizer in 225 g of 2-propanol as a polar organic solvent, and the silica fine particles were fully dispersed with ultrasonic vibration, to give a dispersion. 2.0 Grams of 2,2'-azobisisobutyronitrile as a radical polymerization initiator was added to the above dispersion, and then a monomer mixture containing 8.0 g (0.08 mol) of methyl methacrylate monomer as a monofunctional vinyl monomer (M) and a 2.7 g (0.014 mol) of ethylene glycol dimethacrylate as a polyfunctional vinyl monomer (P) (charged P/M molar ratio=14/86 mol %) was added to, and dissolved in, the dispersion. Thereafter, the dispersion was temperature-increased up to 65° C., and while the dispersion was stirred at this temperature, the above monomer mixture was polymerized.

The polymerization was carried out for 8 hours, and then the reaction mixture was allowed to cool, and poured into 500 cc of a mixture of 2-propanol and water=1:1 (volume ratio) to terminate the polymerization. By this polymerization, an intended crosslinked resin coating was formed on the surface of each of the surface-treated silica fine particles to give crosslinked resin-coated silica fine particles in the reaction mixture. Further, a number of fine particles of a crosslinked resin formed as a byproduct concurrently with the polymerization were present in a suspended state in the reaction mixture.

Isolation of Crosslinked Resin-Coated Silica Fine Particles

The above mixture into which the reaction mixture had been poured was allowed to stand to precipitate the crosslinked resin-coated silica fine particles. After the crosslinked resin-coated silica fine particles precipitated, the supernatant was removed, and 200 cc of a mixture of methanol and water=1:1 (volume ratio) as a wash liquid was added. Then, the resultant mixture was stirred to disperse the above particles in the above wash liquid. Then, the washing was carried out by consecutively repeating the precipitation of the crosslinked resin-coated silica fine particles and the removal of supernatant three times, to give a clear supernatant, and therefore, the crosslinked resin-coated silica fine particles were finally washed with water and then freeze-dried to give intended crosslinked resin-coated silica fine particles.

Properties of Obtained Crosslinked Resin-Coated Silica Fine Particles

In the above-obtained crosslinked resin-coated silica fine particles, no inter-particle binding was observed among the particles. About 70 particles were selected at random and observed through a scanning electron microscope to show that each particle was substantially spherical and that a coating of crosslinked polymethyl methacrylate was formed on the surface of each silica fine particle without leaving any gap. These crosslinked resin-coated silica fine particles (to be referred to as "crosslinked PMMA-coated silica fine particles" hereinafter) had an average particle diameter of 5.75 μm and a CV value of 1.4% in particle size distribution.

Durability Against Ultrasonic Vibration Treatment

The durability of the above-obtained crosslinked PMMA-coated silica fine particles against the treatment with ultrasonic vibration was studied as follows. First, 1 g of the crosslinked PMMA-coated silica fine particles and 100 cc of a dispersing medium were placed in a flask having an internal volume of 200 cc, and the flask was immersed in a cleaning vessel (internal dimensions: 50 mm (width)×200 mm (length)×100 mm (depth)) of an ultrasonic cleaner (VS150, supplied by Iuchi Seieido K.K.) of which the frequency was 50 kHz and the output was 150 W. Then, the ultrasonic treatment was carried out under the output conditions of 50 kHz and 150 W for 1 hour. In this case, as the above dispersing medium, a lower alcohol such as methanol or 2-propanol, a mixed solvent of the lower alcohol and pure water, or pure water was used, or various dispersing media were used to carry out the test. Further, water was placed in the cleaning vessel of the ultrasonic cleaner up to a portion as high as ⅔ of the height of the cleaning vessel.

When a predetermined number of the crosslinked PMMA-coated silica fine particles were selected at random and observed through a scanning electron microscope after the ultrasonic treatment was finished, it was observed that none of the dispersing media caused changes such as peeling of the crosslinked PMMA coating, etc.

Resistance to Liquid Crystal

For studying the resistance of the above-obtained crosslinked PMMA-coated silica fine particles to a liquid crystal, 1 g of the crosslinked PMMA-coated silica fine particles were mixed with 2 cc of a STN liquid crystal (ZLI-5150-075, supplied by Merck), the mixture was sealed in a container and heat-treated by allowing the container in stand in an oven at 90C for 3 days, and the liquid crystal was measured for a specific resistance. As a result, the heat-treated liquid crystal showed a specific resistance of $2.0 \times 10^{11}$ Ωcm, and this value had almost no change from the original specific resistance, $2.1 \times 10^{11}$ Ωcm, of the above STN liquid crystal. This result shows that the above crosslinked PMMA-coated silica fine particles have resistance to a liquid crystal and substantially do not undergo the elution of detrimental components such as ion even if brought into contact with a liquid crystal.

Preparation of Liquid Crystal Cell and Test for Performance as Spacer

The above-obtained crosslinked PMMA-coated silica fine particles were used to produce a liquid crystal cell as follows. First, a predetermined amount of the above-obtained PMMA-coated silica fine particles were dispersed in a mixed solvent containing 2-propanol and pure water to obtain a spray solution. Separately, there were prepared two glass substrates each of which had ITO electrodes having a predetermined form and an oriented film provided so as to cover the ITO electrodes and had a sealing material provided in predetermined positions. Then, the above spray solution was sprayed to a predetermined surface (surface provided with the oriented film) of one of the above two glass substrates, and the other glass substrate was placed thereon such that the oriented films of the glass substrates were positioned inwardly. Then, while a load of 0.4 kgf/cm was applied to the stacked two glass substrates, the two glass substrates were heated up to 180° C. to cure the above sealing material, whereby a liquid crystal cell was obtained.

In the so-obtained liquid crystal cell, the cell gap was substantially uniform all through the cell, and the cell gap value was substantially the same as the value of the cell gap of a liquid crystal cell produced using silica fine particles which were not coated with the crosslinked PMMA. It is seen from the above that, in each crosslinked PMMA-coated silica fine particle, the crosslinked PMMA coating was compressed to be spread under a load and heat applied at the time of producing the liquid crystal cell so that the crosslinked PMMA-coated silica fine particles and the glass substrate were brought into contact to form contact planes.

Further, an STN liquid crystal (ZLI-5150-075, supplied by Merck) was poured into the above liquid crystal cell, and the inlet was sealed. For removing liquid crystal adhering to the peripheral portion of the liquid crystal cell, the crystal cell was placed in an ultrasonic cleaning vessel and exposed to ultrasonic wave at 150W for 15 minutes to study whether or not orientation disorder took place. As a result, no orientation disorder was observed. It is thereby found that the crosslinked PMMA coatings did not spread more than necessary under a load and heat applied at the time of producing the liquid crystal cell and that the spacer substantially did not move after the production of the liquid crystal cell.

Example 2

Step (C)—Formation of Second Crosslinked Resin Layer

5 Grams of the crosslinked PMMA-coated silica fine particles obtained in Example 1 were added to a solution of 10.0 g of polyvinylpyrrolidone K-90 (molecular weight 400,000, supplied by Wako Purechemical industries, Ltd.) as a dispersion stabilizer in 225 g of 2-propanol as a polar organic solvent, and the crosslinked PMMA-coated silica fine particles were fully dispersed therein with ultrasonic vibration, to give a dispersion. 2.0 Grams of 2,2'-azobisisobutyronitrile as a radical polymerization initiator was added to the above dispersion, and then, a monomer mixture consisting of mixed liquid of 8.0 g (0.08 mol) of a methyl methacrylate monomer as a monofunctional vinyl monomer (M) and 2.7 g (0.014 mol) of ethylene glycol dimethacrylate as a polyfunctional vinyl monomer (P) (charged P/M molar ratio=14/86 mol %) was added to, and dissolved in, the above dispersion. Then, the dispersion was temperature-increased up to 65° C., and while the dispersion was maintained at this temperature, the above monomer mixture was polymerized.

After the polymerization was carried out for 8 hours, the reaction mixture was poured into a mixed solution of 2-propanol and water=1:1 (volume ratio) to terminate the polymerization. By this polymerization, a desired crosslinked resin coating was formed on the surface of each of the surface-treated silica fine particles, to form crosslinked resin-coated silica fine particles in the reaction mixture. Further, a number of fine particles of a crosslinked resin formed concurrently with the polymerization were present in a suspended state in the reaction mixture.

Isolation of Two-Layered Crosslinked Resin-Coated Silica Fine Particles

The above mixture into which the reaction mixture had been poured was allowed to stand to precipitate the crosslinked resin-coated silica fine particles. Thereafter, in the same manner as in Example 1, the washing with a wash liquid (mixture of methanol and water=1:1 (volume ratio)) and water was carried out to remove the fine particles of the crosslinked resin produced as a byproduct in the above polymerization, and the washed two-layered crosslinked resin-coated silica fine particles were freeze-dried to give intended crosslinked resin-coated silica fine particles.

Properties of Two-Layered Crosslinked Resin-Coated Silica Fine Particles

In the above-obtained crosslinked resin-coated silica fine particles, no inter-particle binding was observed among the particles, and each particle was spherical. As a result of the observation through a scanning electron microscope, these crosslinked PMMA-coated silica fine particles had an average particle diameter of 6.37 µm, which showed that the first and second dispersion polymerizations formed a crosslinked PMMA coating having the structure of two layers each of which had a thickness of about 0.5 µm on the surface of each of the silica fine particles. The crosslinked PMMA-coated silica fine particles had a CV value of 1.5% in particle size distribution.

The above-obtained crosslinked PMMA-coated silica fine particles were excellent in durability to ultrasonic vibration treatment and resistance to a liquid crystal and had suitability as a spacer for a liquid crystal display device.

Example 3

Step (A)—Surface Treatment of Calcined Silica Fine Particles

630 Grams of 2-propanol was placed in a flask having a stirrer and having an internal volume of 2 liters, and then, 100 g of calcined silica fine particles (total surface area=101 m$^2$) having a particle size distribution of monodisperse (average particle diameter 3.2 µm, CV value of particle size distribution 1.3%, each particle being substantially spherical, calcining temperature 500° C., particle strength 85 kgf/mm$^2$) were added and mixed therewith. The above silica fine particles were dispersion-treated with ultrasonic vibration for 15 minutes, and then 630 g of methanol and 250 g of 25% aqueous ammonia were added to give a dispersion in which the silica fine particles were homogeneously dispersed. While the dispersion was stirred with a stirring blade made of polytetrafluoroethylene at a rotation rate of 200 rounds per minute, a mixture containing 43 g (0.173 mol) of γ-methacryloxypropyltrimethoxysilane as a vinyl-containing silane coupling agent and 5.6 g (0.027 mol) of tetramethoxysilane as a silicon alkoxide was added to the above dispersion over 15 minutes. After the addition, the resultant solution was temperature-increased up to 60° C., and the hydrolysis was carried out at this temperature for 8 hours to surface-treat the silica fine particles.

After the surface treatment was finished, the solution was allowed to stand to precipitate the surface-treated silica fine particles, the supernatant was removed, and then methanol was added to re-disperse the surface-treated silica fine particles. Then, the procedures of the dispersion and the precipitation were repeated to wash the surface-treated silica fine particles, methanol was removed, and the surface-treated silica fine particles were dried in an oven at 150° C. for 1 hour. The so-obtained surface-treated silica fine particles had γ-methacryloxypropyl group introduced onto their surfaces.

Step (B)—Formation of Crosslinked Resin Coating

50 Grams of 2-propanol as a polar organic solvent was placed in a flask having an internal volume of 1 liter, and 5.0 g of the above-obtained surface-treated silica fine particles were added thereto, and thereafter the silica fine particles were fully dispersed with ultrasonic vibration. Separately, a solution of 7.5 g of polyvinylpyrrolidone K-90 (supplied by Wako Purechemical Industries, Ltd.: molecular weight 400, 000) as a dispersion stabilizer in 225 g of 2-propanol was prepared. This solution was mixed with the above dispersion to obtain a mixed solution. To the mixed solution was added a solution prepared by adding 1.5 g of 2,2'-azobisisobutyronitrile as a radical polymerization initiator to a mixture consisting of 6.0 g (0.058 mol) of styrene as a monofunctional vinyl monomer (M) and 2.0 g of a monomer composition (supplied by Wako Purechemical Industries, Ltd.) containing 55% by weight of divinylbenzene (divinylbenzene=0.008 mol) as a polyfunctional vinyl monomer (P) and a monofunctional vinyl monomer as well (charged P/M molar ratio of the mixture=11/89 mol %). The resulting mixture was stirred to give a dispersion in which the monomer mixture was dissolved.

The above dispersion was re-charged into an egg plant type flask having an internal volume of 1 liter, the flask was set in a stirrer, and while the flask was rotated in a constant-temperature vessel at a rate of 60 rounds per minute, the above monomer mixture was polymerized. After the polymerization was carried out for 8 hours, the reaction mixture was poured into a large amount of methanol and stirred to terminate the polymerization. By this polymerization, a desired crosslinked resin coating was formed on the surface of each of the above surface-treated silica fine particles, to form crosslinked resin-coated silica fine particles in the reaction mixture. Further, a number of fine particles of a crosslinked resin formed concurrently with the polymerization were present in a suspended state in the reaction mixture.

Isolation of Crosslinked Resin-Coated Silica Fine Particles

The above mixture after the reaction mixture had been poured was allowed to stand to precipitate the crosslinked resin-coated silica fine particles. Thereafter, in the same manner as in Example 1, the washing with a wash liquid (mixture of methanol and water=1:1 (volume ratio)) and water was carried out to remove the fine particles of the crosslinked resin produced as a byproduct in the above polymerization, and then, the washed crosslinked resin-coated silica fine particles were freeze-dried, whereby intended crosslinked resin-coated silica fine particles were isolated.

Properties of the So-Obtained Crosslinked Resin-Coated Silica Fine Particles In the above-obtained crosslinked resin-coated silica fine particles, no inter-particle binding was observed among the particles. About 70 particles were selected at random and observed through a scanning electron microscope to show that these particles had an average particle diameter of 3.4 µm and that each particle was a substantially spherical one having a surface formed of a 0.1 µm thick crosslinked polystyrene coating (to be referred to as "crosslinked polystyrene-coated silica fine particles" hereinafter). These crosslinked polystyrene-coated silica fine particles had a CV value of 1.3%, and retained the CV value of the calcined silica fine particles as a matrix.

Durability Against Ultrasonic Vibration Treatment

The above-obtained crosslinked polystyrene-coated silica fine particles were studied for durability against ultrasonic vibration treatment in the same manner as in Example 1. As a result, it was observed similarly to Example 1 that none of the dispersing medium caused changes such as the peeling of a crosslinked polystyrene coating.

Resistance to Liquid Crystal

The resistance of the above-obtained crosslinked polystyrene-coated silica fine particles to a liquid crystal was studied in the same manner as in Example 1. As a result, the STN liquid crystal after the heat treatment showed a specific resistance of $2.1 \times 10^{11}$ Ωcm, and this value had no change from the original specific resistance, $2.1 \times 10^{11}$ Ωcm, of the above STN liquid crystal. This result shows that the above crosslinked polystyrene-coated silica fine particles have resistance to a liquid crystal and substantially do not undergo the elution of detrimental components such as ion even if brought into contact with a liquid crystal.

Preparation of Liquid Crystal Cell and Test for Performance as a Spacer

A liquid crystal cell was prepared using the above-obtained crosslinked polystyrene-coated silica fine particles, and the pouring of an STN liquid crystal into the liquid crystal cell and the ultrasonic cleaning for removing liquid crystal adhering to the peripheral portion of the liquid crystal cell were carried out, in the same manner as in Example 1. As a result, no orientation disorder was observed. This result show that the crosslinked polystyrene coating substantially did not spread more than necessary under a load and heat applied at the time of preparing the liquid crystal cell, and that the spacer substantially did not move after the preparation of the liquid crystal cell.

Example 4

Crosslinked polystyrene-coated silica fine particles were obtained in the same manner as in Example 3 except that the mixture consisting of 6.0 g of styrene and 2.0 g of a 55% divinyl benzene-containing monomer composition was replaced with 8.0 g of a 55% by weight of divinylbenzene-containing monomer composition (supplied by Wako Purechemical Industries, Ltd.=divinylbenzene=0.034 mol, charged P/M molar ratio=56/44 mol %). The observation thereof through a scanning electron microscope showed that these crosslinked polystyrene-coated silica fine particles had an average particle diameter of 3.5 µm, and that each particle was a substantially spherical one having a surface uniformly formed of a 0.15 µm thick crosslinked polystyrene coating. These crosslinked polystyrene-coated silica fine particles had a CV value of 1.6% in particle size distribution.

Durability Against Ultrasonic Vibration Treatment

The above-obtained crosslinked polystyrene-coated silica fine particles were studied for durability against ultrasonic vibration treatment in the same manner as in Example 1. As a result, it was observed similarly to Example 1 that none of the dispersing medium caused changes such as the peeling of a crosslinked polystyrene coating.

Preparation of Liquid Crystal Cell and Test for Performance as a Spacer

A liquid crystal cell was prepared using the above-obtained crosslinked polystyrene-coated silica fine particles, and the pouring of an STN liquid crystal into the liquid crystal cell and the ultrasonic cleaning for removing liquid crystal adhering to the peripheral portion of the liquid crystal cell were carried out in the same manner as in Example 1. As a result, no orientation disorder was observed. This result show that the crosslinked polystyrene coating substantially did not spread more than necessary under a load and heat applied at the time of preparing the liquid crystal cell, and that the spacer substantially did not move after the preparation of the liquid crystal cell.

Example 5

In this Example, before the surface treatment with a vinyl-containing silane coupling agent in the step (A), the calcined silica fine particles having a high calcining degree, obtained by high-temperature calcination, were surface-treated with silicon alkoxide to introduce silanol group onto the surfaces of the silica fine particles.

100 Grams of calcined silica fine particles having a particle size distribution of monodisperse (average particle diameter 5.32 μm, CV value of particle size distribution 0.78%, each particle being spherical, calcining temperature 1,000° C., for 9 hours, particle strength 300 kgf/mm²) were placed in a flask having an internal volume of 3 liters, and 1,280 ml of 1-butanol was added. The above calcined silica fine particles were fully dispersed with ultrasonic vibration. 25 wt % Aqueous ammonia in an amount of 2.49 ml was added to the dispersion, and the dispersion was fully stirred at 30OC for 1 hour. 2-Propanol in an amount of 400 ml was added, and further, a mixture of 41.66 g of tetraethoxysilane as a silicon alkoxide and 320 ml of 1-butanol was added. The dispersion was stirred at 30° C. for 1 hour, and then a mixture of 28.8 g of 25 wt % aqueous ammonia and 250 ml of 2-propanol was dropwise added over 30 minutes. The resultant solution was stirred at 30° C. for 10 hours. Then, the solution was allowed to stand to precipitate the silica fine particles, and the supernatant was removed, to give precipitated fine particles. The precipitation of the precipitated fine particles in methanol and the decantation were repeated three times, the methanol was removed, and then the remainder was stirred in an oven at 120° C. for 1 hour, to give silicon alkoxide-treated calcined silica fine particles.

The above silicon alkoxide-treated calcined silica fine particles had a non-calcined silica layer having a thickness of several nm each and had an average particle diameter of 5.34 μm and a CV value, in particle size distribution, of 0.8% (monodispersed), and each particle was substantially spherical.

The so-obtained silicon alkoxide-pretreated calcined silica fine particles were surface-treated with the vinyl-containing silane coupling agent, and then crosslinked resin coatings were formed, in the same manner as in Example 1, to give crosslinked resin-coated silica fine particles.

It was found that the above-obtained crosslinked resin-coated silica fine particles were excellent in the durability against the ultrasonic vibration treatment and the resistance to a liquid crystal like those in Example 1 so that they were suitable as a spacer for a liquid crystal display device.

Comparative Example 1

Calcined silica fine particles which were not at all surface-treated and had a particle size distribution of monodisperse (average particle diameter 3.2 μm, calcining temperature 500° C., particle strength 85 kgf/mm²) were used. An attempt was made to coat the above calcined silica fine particles with a crosslinked polystyrene resin in the same manner as in Example 3, but the observation through a scanning electron microscope showed that no coating was formed.

The preparation of a liquid crystal cell using the above-obtained fine particles as a spacer, the pouring of an STN liquid crystal into the liquid crystal cell, and the ultrasonic cleaning for the removal of liquid crystal adhering to the peripheral portion of the liquid crystal cell, were consecutively carried out in the same manner as in Example 1, and then, the movement of the liquid crystal was studied on the basis of orientation disorder of the liquid crystal. As a result, it was found as an orientation disorder that the spacer had moved.

The above result shows that calcined silica fine particles which are not surface-treated with the silane coupling agent (for which the step (A) of the present invention was not carried out) have no polymerizable functional group reactive with a monomer on their surfaces so that no crosslinked resin coating is formed.

Comparative Example 2

Silica fine particles surface-modified with methyl group were obtained by surface-treating silica fine particles having a particle size distribution of monodisperse in the same manner as in the step (A) of Example 3 except that the γ-methacryloxypropyltrimethoxysilane as a vinyl-containing silane coupling agent was replaced with methyltriehoxysilane as a silane coupling agent having no vinyl group. Each of the so-obtained silica fine particles had water repellency equivalent to that of the silica fine particles surface-treated with γ-methacryloxypropyltrimethoxysilane, obtained in the step (A) of Example 3. An attempt was made to coat the above silica fine particles with a crosslinked polystyrene resin under the same conditions as those in step (B) of Example 3, but the observation through a scanning electron microscope showed that no coating was formed.

The preparation of a liquid crystal cell using the above-obtained fine particles as a spacer, the pouring of an STN liquid crystal into the liquid crystal cell, and the ultrasonic cleaning for the removal of liquid crystal adhering to the peripheral portion of the liquid crystal cell, were consecutively carried out in the same manner as in Example 1, and then, the movement of the liquid crystal was studied on the basis of orientation disorder of the liquid crystal. As a result, it was found as an orientation disorder that the spacer had moved.

The above result shows that calcined silica fine particles which are surface-treated with a silane coupling agent having no vinyl group have no polymerizable functional group reactive with a monomer on their surfaces so that no crosslinked resin coating is formed.

Comparative Example 3

First, calcined silica fine particles having γ-methacryloxypropyl group introduced on their surfaces were obtained in the same manner as in the step (A) of Example 1. Then, 0.1 g of azobisisobutyronitrile and 20 g of dioxane were added to 1 g of the above silica fine-particles, and the mixture was allowed to react at 70° C. for 1.5 hours. Thereafter, an attempt was made to form a crosslinked resin coating on each of the above silica fine particles by dropwise adding a monomer mixture containing 2 g of a methyl methacrylate monomer as a monofunctional vinyl monomer and a 0.67 g of ethylene glycol dimethacrylate as a polyfunctional vinyl monomer in the same manner as in the step (B) of Example 1 except that no dispersion stabilizer was used.

In this case, 30 minutes after the above mixture was added, the reaction mixture had an abnormally high viscosity, and after 1 hour passed, the reaction mixture as a whole gelled. It is assumed that this gelatin occurred for the following reason. That is, in the above polymerization process, not all of the monomer undergoes polymerization on the surfaces of the silica fine particles, and a polymer is by-produced in places other than the surfaces of the silica fine particles. This by-produced polymer is dissolved in dioxane as a solvent, and is concurrently gradually crosslinked. As a result, the reaction mixture gelled.

After the polymerization was carried out for 1 hour, an attempt was made to wash the gelled reaction mixture by pouring it into a large amount of dioxane, while the by-produced crosslinked polymer had low solubility in dioxane so that the crosslinked resin-coated silica fine particles and the by-produced crosslinked polymer were no longer separated. Therefore, the crosslinked resin-coated silica fine particles were no longer collected.

The above result show that when the polymerization for a crosslinked resin coating is carried out without adding a dispersion stabilizer, the intended crosslinked resin-coated silica fine particles were no longer obtained since silica fine particles each of which has a crosslinked resin coating formed on the surface and crosslinked resin particles produced as a byproduct in the reaction mixture are not uniformly dispersed in the reaction mixture, so that not only the polymerization on the surfaces of the fine particles by a so-called dispersion polymerization proceeds but also the silica fine particles themselves having crosslinked resin coatings on their surfaces are bounded(bound) to each other, and the crosslinked resin particles themselves produced as a byproduct in the reaction mixture are bonded (bound) to each other, respectively.

Effect of the Invention

As explained above, the crosslinked resin-coated silica fine particles of the present invention have high strength and high hardness as a whole and can perform the function of a spacer for a long period of time when used as a spacer for a liquid crystal display device. Further, when the crosslinked resin-coated silica fine particles of the present invention are dispersed in a dispersing medium with ultrasonic vibration, the peeling of crosslinked resin coatings substantially does not occur. That is, they have durability against ultrasonic vibration treatment. Moreover, when used as a spacer for a liquid crystal display device, they substantially do not move after the formation of a liquid crystal cell, and substantially do not affect a liquid crystal itself and its orientation.

The crosslinked resin-coated silica fine particles of the present invention satisfy the average particle diameter and the monodisperse property of a particle size distribution which a spacer for a liquid crystal display device is required to have, and these crosslinked resin-coated silica fine particles can be directly used as a spacer for a liquid crystal display device without classifying them, by producing them according to the method of the present invention.

As explained above, according to the present invention, there can be easily provided crosslinked resin-coated silica fine particles suitable as a spacer for a liquid crystal display device.

What is claimed is:

1. Crosslinked resin-coated silica fine particles comprising (a) calcined silica particles which are surface-treated with silicone alkoxide or a partial hydrolysis product thereof after calcination, and (b) crosslinked resin coatings each of which has a structure of a single layer or a plurality of layers formed on a surface of each calcined silica fine particle through a vinyl-containing silane coupling agent.

2. The crosslinked resin-coated silica fine particles of claim 1, wherein the crosslinked resin-coated silica fine particles have an average particle diameter of 0.6 to 17 μm and a particle size distribution whose coefficient of variability is 2% or less.

3. The crosslinked resin-coated silica fine particles of claim 1, wherein the crosslinked resin coating formed on the surface of each silica fine particle is a product obtained by dispersion-polymerizing a mixture containing a monofunctional vinyl monomer and a polyfunctional vinyl monomer.

4. The crosslinked resin-coated silica fine particles of claim 1, wherein each crosslinked resin coating formed on each silica fine particle has a thickness of 0.05 to 1 μm.

5. The crosslinked resin-coated silica fine particles of claim 1, wherein each crosslinked resin coating formed on each silica fine particle has durability against ultrasonic vibration treatment carried out for dispersing a predetermined amount of the crosslinked resin-coated silica fine particles in a dispersing medium.

6. A process for the production of crosslinked resin-coated silica fine particles, comprising the steps of (A) surface-treating calcined silica fine particles with a vinyl-containing silane coupling agent to introduce vinyl group onto a surface of each silica fine particle; and (B) dispersing and polymerizing a mixture containing a monofunctional vinyl monomer (M) and a polyfunctional vinyl monomer (P) and having a charged P/M molar ratio of 0.5/99.5 to 70/30 mol % in a polar organic solvent in the presence of a dispersion stabilizer and a radical polymerization initiator, to form a crosslinked resin coating on a surface of each of the surface-treated silica fine particles.

7. The process for the production of crosslinked resin-coated silica fine particles as recited in claim 6, wherein the calcined silica fine particles are reacted with silicon alkoxide or a partial hydrolysis product thereof concurrently with, and/or before, the surface treatment with the vinyl-containing silane coupling agent.

8. The process for the production of crosslinked resin-coated silica fine particles as recited in claim 6, wherein the calcined silica fine particles have an average particle diameter of 0.5 to 15 μm and a coefficient of variability of 2% or less.

9. A process for the production of crosslinked resin-coated silica fine particles having a structure of a plurality of layers, wherein a step (C) is carried out at least once, said step (C) being the step of further forming a crosslinked resin coating on a crosslinked resin coating by dispersing the crosslinked resin-coated silica fine particles obtained by the process as recited in claim 6 in a polar organic solvent in the presence of a dispersion stabilizer and a radical polymerization initiator, and dispersion-polymerizing a mixture containing a monofunctional vinyl monomer (M) and a polyfunctional vinyl monomer (P) and having a charged P/M molar ratio of 0.5/99.5 to 70/30 mol %.

* * * * *